(12) United States Patent
Walter et al.

(10) Patent No.: US 7,701,934 B2
(45) Date of Patent: Apr. 20, 2010

(54) SYSTEM AND METHOD FOR MANAGING DEVICES WITHIN A PRIVATE NETWORK VIA A PUBLIC NETWORK

(75) Inventors: Edward Walter, Boerne, TX (US); Jae-Sun S Chin, Helotes, TX (US); Robert Raymond Popp, Jr., New Braunfels, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 860 days.

(21) Appl. No.: 10/979,736

(22) Filed: Nov. 2, 2004

(65) Prior Publication Data

US 2006/0092931 A1    May 4, 2006

(51) Int. Cl.
*H04L 12/28*   (2006.01)
*H04L 12/56*   (2006.01)

(52) U.S. Cl. .................. 370/389; 370/399; 370/395.3; 709/223

(58) Field of Classification Search ................. 370/389, 370/390, 394, 399, 395.3; 709/223
See application file for complete search history.

(56) References Cited

U.S. PATENT DOCUMENTS

| | | | |
|---|---|---|---|
| 5,678,006 A | | 10/1997 | Valizadeh et al. |
| 6,278,976 B1 * | | 8/2001 | Kochian ................ 704/500 |
| 6,640,248 B1 * | | 10/2003 | Jorgensen .............. 709/226 |
| 6,681,232 B1 * | | 1/2004 | Sistanizadeh et al. .... 707/104.1 |
| 6,725,264 B1 * | | 4/2004 | Christy .................. 709/225 |
| 6,732,181 B2 * | | 5/2004 | Lim et al. .............. 709/229 |
| 6,799,220 B1 | | 9/2004 | Merritt et al. |
| 6,847,614 B2 * | | 1/2005 | Banker et al. .......... 370/252 |
| 7,127,508 B2 * | | 10/2006 | Edmison et al. ........ 709/224 |
| 7,167,473 B1 * | | 1/2007 | Nguyen ................. 370/392 |
| 7,274,684 B2 * | | 9/2007 | Young et al. ........... 370/352 |
| 7,310,356 B2 * | | 12/2007 | Abdo et al. ............ 370/522 |
| 7,315,888 B2 * | | 1/2008 | Shibata ................. 709/223 |
| 7,433,319 B2 * | | 10/2008 | Schine et al. .......... 370/248 |
| 7,437,449 B1 * | | 10/2008 | Monga et al. .......... 709/224 |
| 2003/0108041 A1 * | | 6/2003 | Aysan et al. ........... 370/389 |
| 2004/0044756 A1 * | | 3/2004 | Johnson ................ 709/223 |
| 2004/0193918 A1 * | | 9/2004 | Green et al. ........... 713/201 |
| 2005/0165834 A1 * | | 7/2005 | Nadeau et al. ....... 707/103 R |
| 2006/0015587 A1 * | | 1/2006 | Bose .................... 709/220 |
| 2006/0053221 A1 * | | 3/2006 | Matsui et al. .......... 709/225 |
| 2006/0077988 A1 * | | 4/2006 | Cheng et al. ........... 370/401 |

* cited by examiner

*Primary Examiner*—Rafael Pérez-Gutiérrez
*Assistant Examiner*—Allahyar Kasraian
(74) *Attorney, Agent, or Firm*—Toler Law Group

(57) ABSTRACT

A network management system includes a processor and a memory that is accessible by the processor. A computer program is embedded within the memory. The computer program includes instructions to detect the receipt of one or more modified management messages. Each of the one or more modified management messages includes one or more modified data packets having a unique identifier. The computer program further includes instructions to determine an originating device associated with each of the unique identifiers. In a particular embodiment, the unique identifier is a predetermined device management password. Further, the predetermined device management password is a community string for a simple network management protocol data packet.

24 Claims, 3 Drawing Sheets

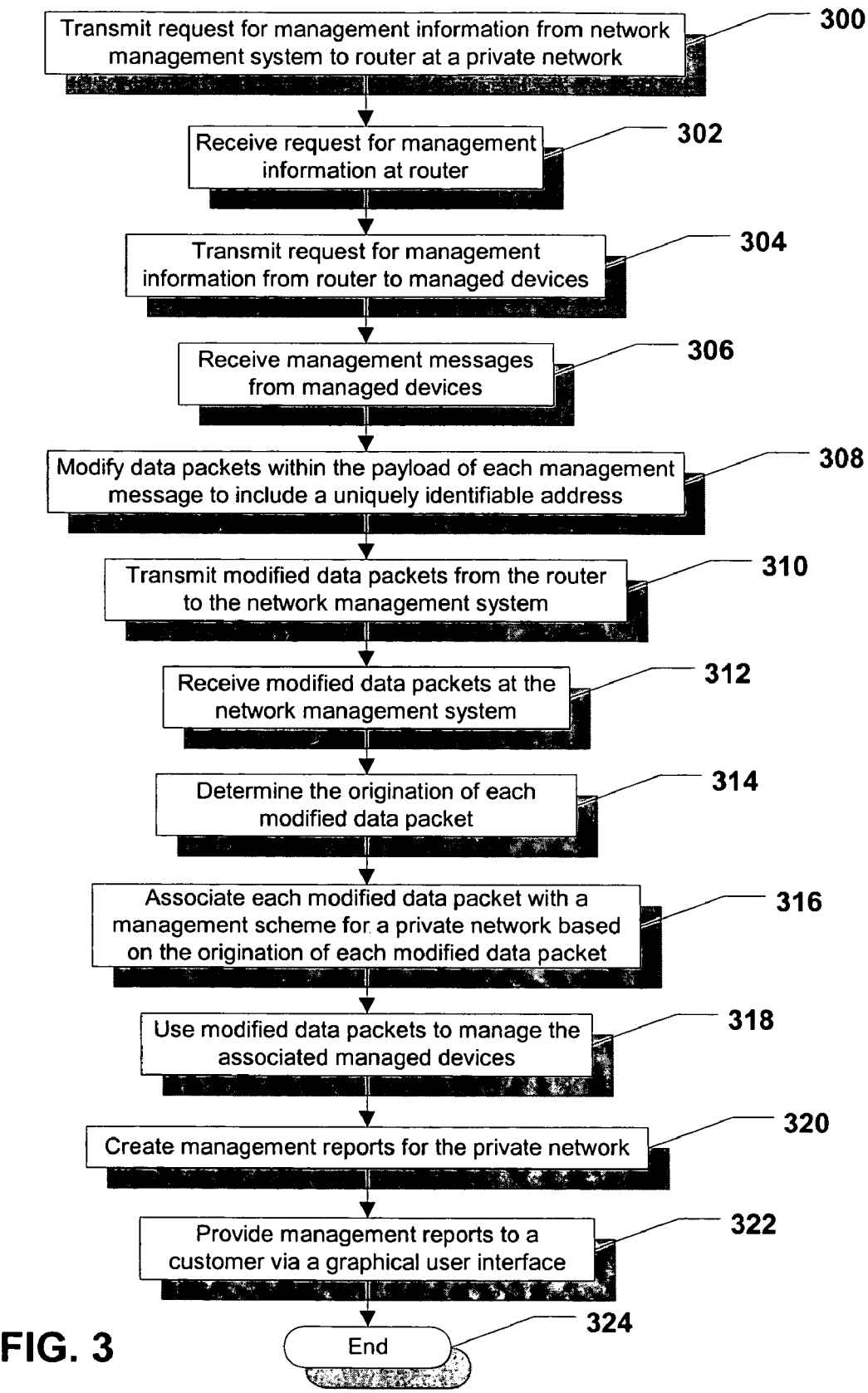

SYSTEM AND METHOD FOR MANAGING DEVICES WITHIN A PRIVATE NETWORK VIA A PUBLIC NETWORK

FIELD OF THE DISCLOSURE

The present disclosure relates generally to the management of multiple private networks by a network management system via a public network.

BACKGROUND

Network management is important to businesses, government agencies, schools, banks, hospitals, and other institutions having multiple computers connected via a network. Simple network management protocol (SNMP) is one solution for remotely managing devices connected via a network. SNMP can be used to monitor managed devices using a polling method or a trapping method. A polling method allows a network management system (NMS) to collect information from remotely managed devices by prompting the managed devices to send management messages to the NMS on a specific schedule. On the other hand, a trapping method allows remotely managed devices to automatically send management messages to an NMS without prompting. In a management message sent via SNMP, the source Internet protocol (IP) address is recorded in the IP header of the message and in the payload of the message.

For networked devices to communicate with each other, every networked device has a unique IP address. For example, each device connected to the Internet is assigned a unique IP address having the following format ###.###.###.###. As such, each device can be identified when necessary. A range of available IP addresses are reserved for use by private networks and the same private IP addresses can be used in different private networks. Request for comment (RFC) 1918 indicates that the private addresses include the IP addresses from 10.0.0.0 to 10.255.255.255, the IP addresses from 172.16.0.0 to 172.31.255.255, and the IP addresses from 192.168.0.0 to 192.168.255.255.

In certain instances, one private network may have a plurality of devices that have the same private IP address as devices in another private network. This typically is not a problem because the networks are private and are not interconnected. If the privately networked devices do interact via a public network, e.g., the Internet, network address translation (NAT) can modify the IP address in the header of a message in order to assign a unique identifier to the header of the message. However, NAT does not modify the payload of the message. When managing multiple private networks via a public network, it is possible for duplicate IP addresses to occur in the payloads of management messages. Thus, it can be very difficult to manage multiple private networks via a public network using SNMP and NAT.

Accordingly, there is a need for an improved system and method for managing multiple private networks via a public network.

BRIEF DESCRIPTION OF THE DRAWINGS

The present invention is pointed out with particularity in the appended claims. However, other features are described in the following detailed description in conjunction with the accompanying drawings in which:

FIG. 3 is a flow chart to illustrate a method for managing devices within a private network.

DETAILED DESCRIPTION OF THE DRAWINGS

A network management system includes a processor and a memory that is accessible by the processor. A computer program is embedded within the memory. The computer program includes instructions to detect the receipt of one or more modified management messages. Each of the one or more modified management messages includes one or more modified data packets having a unique identifier. The computer program further includes instructions to determine an originating device associated with each of the unique identifiers.

In a particular embodiment, the computer program includes instructions to request the one or more modified management data packets from the one or more managed devices within the private network. Also, in a particular embodiment, the unique identifier is a predetermined device management password. Further, the predetermined device management password is a community string for a simple network management protocol data packet.

In a particular embodiment, the computer program also includes instructions to manage the one or more managed devices based on the modified data packets. Moreover, the computer program includes instructions to create one or more management reports based on the modified data packets. Additionally, the computer program includes instructions to present the one or more management reports to a user via a graphical user interface.

In another embodiment, a network management router is provided for managing one or more managed devices in a private network. The network management router includes a processor and a memory that is accessible to the processor. Further, a proxy agent is embedded within the memory. The proxy agent includes instructions to detect when one or more of the management messages is received at the network management router. Each of the one or more management messages includes one or more management data packets. The proxy agent also includes instructions to modify the one or more management data packets to include a unique managed device identifier.

In yet another embodiment, a method for managing one or more devices within a private network includes receiving a management message at a network management system coupled to a private network. The management message includes one or more management data packets. Further, each of the one or more management data packets includes a unique identifier that corresponds to one of the one or more devices.

Figure 1:
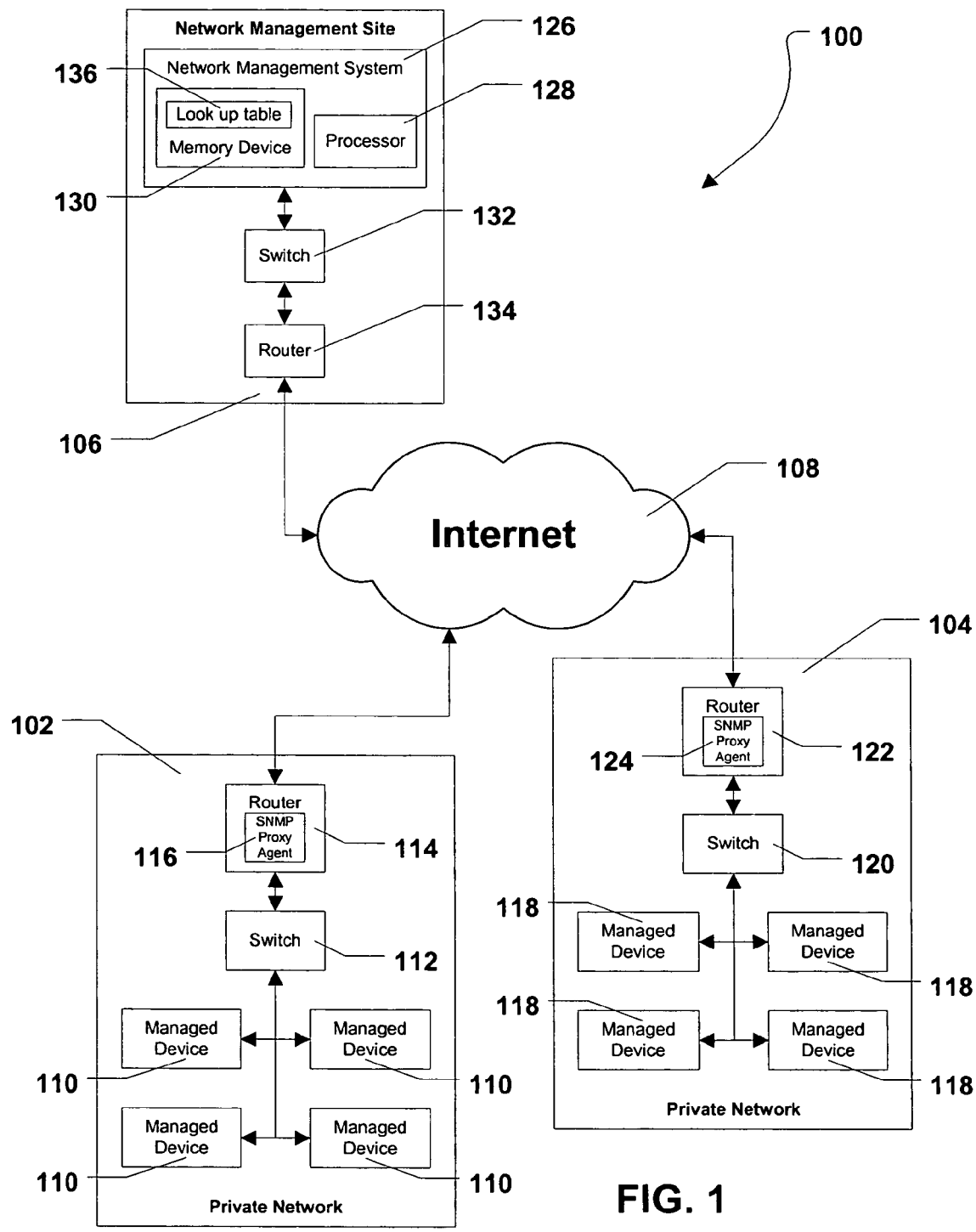
FIG. 1 is a general diagram of a network.

Referring now to FIG. 1, a network is shown and is generally designated 100. FIG. 1 depicts a first private network 102 and a second private network 104, each coupled to a network management site 106 via a public network 108. In a particular embodiment, the public network 108 is the Internet. As illustrated in FIG. 1, the first private network 102 includes a plurality of managed devices 110 coupled to a switch 112. Further, a network management router 114 is coupled to the switch 112 and provides connectivity to the Internet 108.

FIG. 1 also shows a proxy agent 116 within the network management router 114. In a particular embodiment, the proxy agent 116 is embedded within a memory device in the network management router 114. Further, in a particular embodiment, the proxy agent 116 is a simple network management protocol (SNMP) proxy agent. Also, the proxy agent 116 can modify management messages that are sent from the managed devices 110 to the network management site 106 so that each management data packet within the payload of each management message includes a unique identifier. As such, the header of the message is modified and the payload of the message is modified.

In a particular embodiment, the unique identifier is a device management password assigned that is assigned to a particular managed device, e.g., an SNMP community string. The unique identifier can be compared to a table of stored unique identifiers in order to identify the managed device 110 that sent the management message. Particularly, a managed device 110 can be identified by the private address of the managed device 110 and the public address of the network management router 114 to which the managed device 110 is coupled.

As indicated in FIG. 1, the second private network 104 includes a plurality of managed devices 118 that are coupled to a switch 120. The switch 120, in turn, is coupled to a network management router 122 that can provide connectivity to the Internet 108. FIG. 1 shows that the network management router 122 within the private network 104 also includes a proxy agent 124. The proxy agent 124 also assigns a unique identifier to each management data packet within the payload of each management message sent from the managed devices 118 to the network management site 106. Since each management data packet sent from the first private network 102 and from the second private network 104 includes a unique identifier, the network management site 106 is able to accurately manage all of the managed devices 110, 118 within each private network 102, 104 without confusing any one managed device for another managed device, even if some of the managed devices 118 have the same private IP address.

FIG. 1 illustrates that the network management site 106 includes a network management system (NMS) 126. In a particular embodiment, the NMS 126 includes a processor 128 and a memory device 130 that is coupled to the processor 128 so that it can be accessed by the processor 128. In a particular embodiment, the memory device 130 can be an electronically erasable programmable read only memory (EEPROM) device, a flash memory device, a non-volatile random access memory (NVRAM) device, any other RAM device, or any other ROM device. As further shown in FIG. 1, the network management site 106 includes a switch 132 that is coupled to the NMS 126. Also, a router 134 is coupled to the switch 132 and provides network connectivity to the Internet 108. As such, the NMS 126 has connectivity to manage the managed devices 110, 118 in each private network 102, 104. FIG. 1 also depicts a look up table 136 that is embedded within the memory device 130 of the NMS 126. The look up table 136 can store a plurality of SNMP community strings that correspond to the managed devices 110, 118 coupled to the NMS 126.

In a particular embodiment, the NMS 126 can send a plurality of SNMP packets to the managed devices 110, 118 via the network management routers 114, 122. Further, in a particular embodiment, an SNMP packet can include an IP header, a user datagram protocol (UDP) header, and an SNMP portion. The IP header includes a source IP address, a destination IP address, and a protocol number. In the case of UDP, the protocol number is seventeen (17). Also, the UDP header can include a source port number that can be randomly generated. In a particular embodiment, the source port number is in a range from 1024 to 65,000. Further, the UDP header can include a destination port at a router. The SNMP portion of the SNMP packet includes a version number, such as version 1, version 2c, or version 3. Also, the SNMP portion of the SNMP packet includes a command, such as get, trap, etc.

Further, the SNMP portion of the SNMP packet includes a community string. The community string is a user identification or password that can allow access to a managed device in order to obtain information about the managed device, such as, operational statistics.

In a particular embodiment, a query sent by the NMS 126 to a management router 114, 122 includes the public IP address for the NMS 126 as the source IP address for the SNMP packet and the public IP address for the management router 114, 122 as the destination IP address for the SNMP packet. Also, the community string for the SNMP packet is set at a predefined value, e.g., "string1." The community string corresponds to a managed device 110, 118 coupled to the management router 114, 122 and the proxy agent 116, 124 can use the community string, "string1," to obtain an internal address for a corresponding managed device 110, 118 from a lookup table that is accessible by the proxy agent. Then, the management router 114, 122 can send a query to the managed device 110, 118 that includes the private IP address of the router 114, 122 as the source IP address and the private IP address of the managed device 110, 118 derived from the lookup table as the destination address. The community string can be set as a new value, e.g., "public," and the command can be set as "get."

The managed device 110, 118 can send a response to the management router 114, 122 and the response can include the private IP address of the managed device 110, 118 as the source IP address and the private IP address of the management router 114, 122 as the destination IP address. The community string can remain as "public." Also, the SNMP command can be set as "response." The proxy agent 116, 124 can modify the response so that the source IP address of the response from the management router 114, 122 to the NMS is the public IP address of the management router 114, 122 and the destination IP address is the public IP address of the NMS 126. The community string can be modified to the first value, "string1," and the SNMP command can remain "response." The NMS 126 can use the look up table 136 embedded within the memory device 130 in order to determine which managed device 110, 118 at a private network 102, 104 managed by the management router 114, 122 corresponds to "string1." Thus, any problems attributed to overlapping private IP addresses at the different private networks 102, 104 are avoided.

Figure 2:
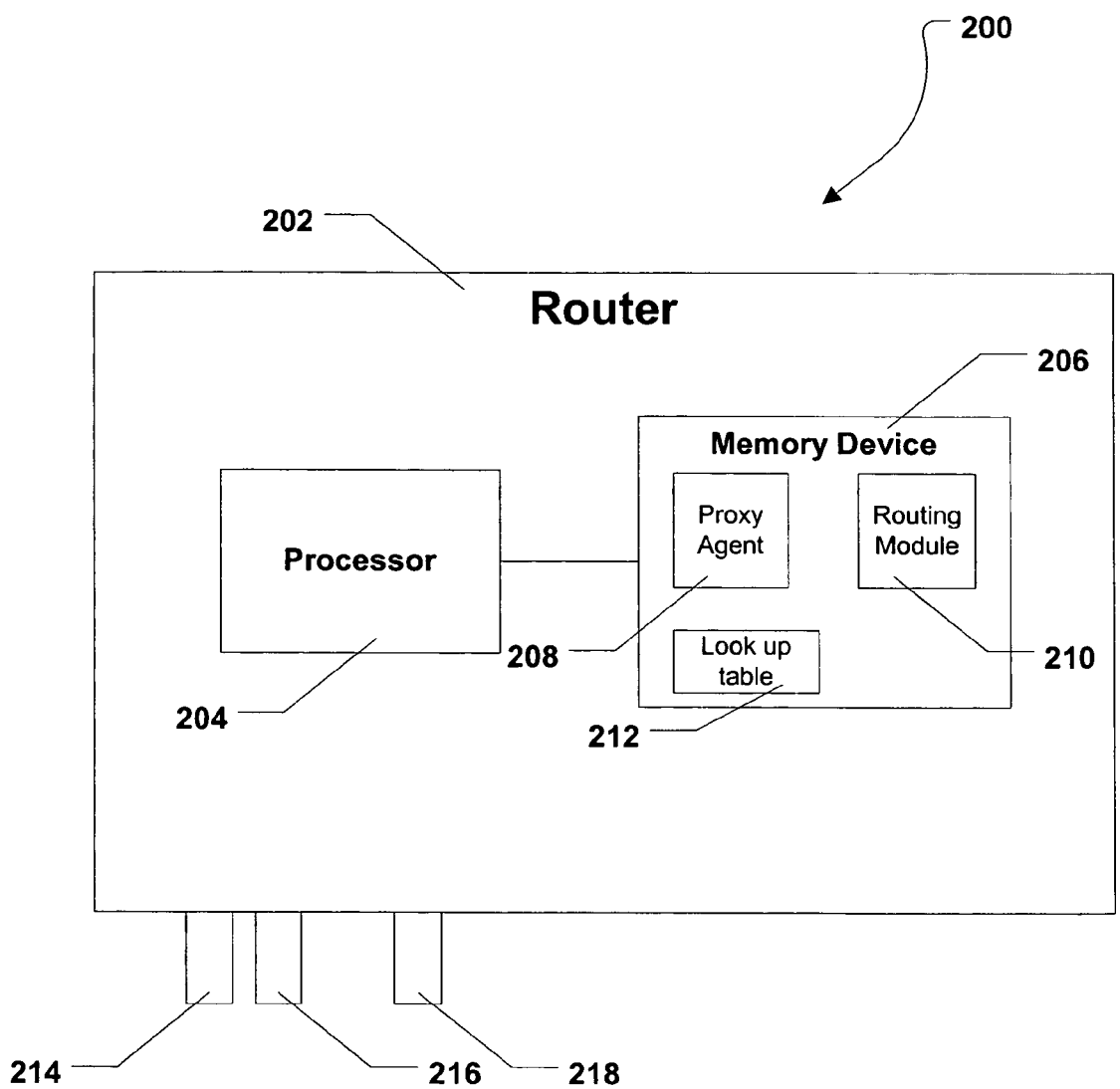
FIG. 2 is a general diagram of a router.

Referring now to FIG. 2, an exemplary, non-limiting embodiment of a network management router is shown and is generally designated 200. FIG. 2 depicts that the network management router 200 includes a housing 202. A processor 204 is disposed within the housing 202 and a memory device 206 is coupled to the processor 204. Further, the processor 204 can access the memory device 206. FIG. 2 also shows a proxy agent 208 embedded within the memory device 208. In a particular embodiment, the proxy agent 208 is an SNMP proxy agent that operates according to the SNMP protocol. Further, a routing module 210 is embedded within the memory device 208 and includes logic for routing data packets to other devices. Also, a look up table 212 is embedded within the memory device 208. In a particular embodiment, the look up table 212 includes a plurality of SNMP community strings and each SNMP community string corresponds to a managed device coupled to the network management router 200.

FIG. 2 shows that the network management router 200 includes a first serial interface 214 and a second serial interface 216. In a particular embodiment, the serial interfaces 214, 216 are wide area network interfaces that provide connectivity outside a local area network, such as, a private network. FIG. 2 also shows that the network management router 200 includes a local area network interface 218. In a particular embodiment, the local area network interface 218 is an Ethernet interface and provides connectivity to devices within the local area network, e.g., a private network.

Referring to FIG. 3, a method for managing devices within a private network via a network management system and via a public network is shown and commences at block 300. At block 300, a NMS transmits a request for management information to a network management router at a private network. Thereafter, at block 302, the network management router receives the request for the management information. Moving to block 304, the network management router transmits the request for management information to one or more managed devices that are located within the private network.

Proceeding to block 306, the network management router receives one or more management messages from one or more of the managed devices. Then, at block 308, the network management router modifies each management message so that the header of each management message includes a unique identifier and so that each management data packet within the payload of the management message also includes a unique identifier that corresponds to the device from which the management message is sent. In an illustrative embodiment, the unique identifier is a device management password that is assigned to a particular managed device of a private network. Further, the unique identifier can be an SNMP community string that can be compared to a look up table in order to determine the managed device from which a management data packet originated. Moving to block 310, the network management router transmits the modified management messages including the modified data packets to the NMS.

Continuing to block 312, the NMS receives one or more of the modified management messages. At block 314, the NMS determines the originating device of each modified data packet within each management message. Moreover, at block 316, the NMS associates each modified data packet with a predefined management scheme for a private network based on the originating device of each modified data packet. In a particular embodiment, the predefined management scheme can be part of a service level agreement (SLA) between a private network customer and a network management company. The SLA can outline the terms of the operation of the private network. For example, the SLA can outline the threshold packet delivery rate for the private network, the threshold latency for the private network, and the jitter for the private network.

At block 318, the NMS uses the modified data packets to manage the associated managed devices. In a particular embodiment, the NMS can use the management data packets to determine whether each managed device is operating within predefined parameters. Additionally, the NMS can use the management data packets to control the operation of each managed device within a private network by establishing the network settings for each managed device. Further, the NMS can use the management messages to modify one or more network settings of the managed devices to ensure that the private network is operating according to the terms of the SLA and the predefined management scheme.

Continuing the description of the method, at block 320, the NMS creates network management reports for devices within various private networks based on the management data packets received from the managed devices within each private network. At block 322, the NMS provides the network management reports to a customer. In a particular embodiment, the network management reports are provided to a customer via a graphical user interface. Further, in a particular embodiment, the network management reports can detail the operation of each managed device. Also, the network management reports can indicate current network settings for each managed device and any changes to the network settings of each managed device. As shown in FIG. 3, the method ends at state 324.

In a particular embodiment, the method depicted in FIG. 3 is a polling method. In other words, the NMS contacts each management router to request management information. The router, in turn, can transmit the request for management information to the managed devices and wait for responsive management messages. When management messages are received, the router can modify the management messages and transmit the management messages to the NMS. In another particular embodiment, the method depicted in FIG. 3 can be a trapping method. In other words, the NMS does not have to request management information from the managed devices and the managed devices can automatically send management messages to the management router. The management router, in turn, can automatically modify the management messages and send the modified management messages to the NMS.

With the configuration of structure described above, the system and method for managing devices within a private network via a public network provides a method to accurately manage the devices within multiple private networks without confusing management data packets from one device within one private network with management data packets from another device within another private network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network management system, comprising
   a processor;
   a memory accessible by the processor;
   a computer program embedded within the memory, the computer program comprising:
      instructions to detect the receipt of one or more modified management messages having a payload, via a public network from a private network, wherein each of the one or more modified management messages including, within the payload, one or more modified data packets, each modified data packet having a unique managed device identifier comprising a community string for a simple network management protocol data packet;
      instructions to compare the community string to entries of a lookup table comprising originating device identifiers to determine an originating device within the private network based on the community string of each of the one or more modified data packets, wherein the community string is useable to distinguish the originating device having a particular private Internet protocol (IP) address within the private network from another managed device having the same particular private IP address within another private network; and
      instructions to manage one or more managed devices in accordance with a service level agreement (SLA), wherein the SLA is determined at least partially based on the one or more modified data packets and wherein the SLA includes a threshold packet delivery rate of the private network, a threshold latency of the private network, and a jitter of the private network.

2. The network management system of claim 1, wherein the computer program further comprises instructions to request the one or more modified management data packets from the one or more managed devices within the private network.

3. The network management system of claim 1, wherein the computer program further comprises instructions to create one or more management reports at least partially based on the modified data packets.

4. The network management system of claim 3, wherein the computer program further comprises instructions to present the one or more management reports to a user via a graphical user interface.

5. A network management router in a private network for managing one or more managed devices in the private network, the network management router comprising:
  a processor;
  a memory accessible to the processor;
  a proxy agent embedded within the memory, the proxy agent comprising:
    instructions to detect when one or more management messages are received at the network management router via the private network from the one or more managed devices, wherein each of the one or more management messages includes, within a payload, one or more management data packets; and
    instructions to modify the one or more management data packets in the payload of each of the one or more management messages to include a unique managed device identifier comprising a community string for a simple network management protocol data packet, the community string compared to entries of a lookup table comprising managed device identifiers to facilitate a determination of the one or more managed devices via a public network and indicating an association of the one or more managed devices with a service level agreement (SLA) of the private network,
  wherein the SLA includes a threshold packet delivery rate of the private network, a threshold latency of the private network, and a jitter of the private network, and
  wherein the community string is useable to distinguish the one or more managed devices having a particular private Internet protocol (IP) address within the private network from other managed devices having the same particular private IP address within other private networks.

6. The network management router of claim 5, wherein the proxy agent further comprises instructions to detect when a request for management information concerning the one or more managed devices is received at the network management router.

7. The network management router of claim 6, wherein the proxy agent further comprises instructions to transmit a request for management information to at least one of the one or more managed devices.

8. The network management router of claim 5, wherein the proxy agent further comprises instructions to transmit one or more modified management data packets to a remote network management system coupled to the network management router via the public network.

9. The network management router of claim 5, wherein the proxy agent is compliant with a simple network management protocol.

10. A method for managing one or more devices within a private network, the method comprising:
  receiving at least one management message at a network management system via a public network from the private network, wherein the at least one management message includes within a payload at least one management data packet and wherein the at least one management data packet includes a unique managed device identifier comprising a community string for a simple network management protocol data packet, wherein the unique managed device identifier corresponding to one of the one or more devices, wherein the community string is compared to entries of a lookup table to identify an originating device of the one or more devices, and wherein the community string is useable to distinguish the originating device having a particular private Internet protocol (IP) address within the private network from another managed device having the same particular private IP address within another private network; and
  using the at least one management data packet to associate the one or more managed devices located within the private network with a service level agreement (SLA) of the private network, wherein the SLA includes a threshold packet delivery rate of the private network, a threshold latency of the private network, and a jitter of the private network.

11. The method of claim 10, further comprising transmitting a request for management information from the network management system to the one or more devices within the private network.

12. The method of claim 10, wherein the at least one management message is transmitted from a router within the private network.

13. The method of claim 12, further comprising assigning, by the router, the unique managed device identifier to the at least one management data packet.

14. The method of claim 12, wherein a proxy agent within the router assigns the unique managed device identifier to the at least one management data packet based on a look up table accessible by the proxy agent.

15. The method of claim 14, wherein the proxy agent is a simple network management protocol proxy agent.

16. The method of claim 10, further comprising determining an origination of the at least one management data packet at least partially based on the unique managed device identifier.

17. The method of claim 10, further comprising using the at least one management data packet to manage the managed device according to the SLA.

18. The method of claim 17, further comprising creating management reports for the private network.

19. The method of claim 18, further comprising displaying the management reports.

20. The method of claim 19, wherein the management reports are provided via a graphical user interface.

21. The method of claim 10, further comprising:
  modifying the payload of the at least one management message to include the unique managed device identifier in the at least one management data packet that corresponds to a device from which the at least one management message was sent; and
  modifying a header of the at least one management message to include a second unique identifier.

22. The network management system of claim 1, wherein each of the one or more modified management messages further comprises a header modified to have a second unique identifier that corresponds to a device from which the management message was sent and further comprising instructions to determine an originating device based on the second unique identifier in the header.

23. The network management router of claim 5, wherein each of the one or more management messages further includes a header; and further comprising instructions to modify the header to include a second unique managed device identifier facilitating a determination of the one or more managed devices via the public network.

24. The method of claim 17, further comprising modifying one or more network settings of the managed device so that the managed device does not cause the private network to violate the SLA.

* * * * *